A. J. LE TARTE.
CONNECTION DEVICE.
APPLICATION FILED JAN. 23, 1920.

1,355,678.

Patented Oct. 12, 1920.

Inventor:
Augustin J. LeTarte,
by W. G. Gartner
Atty.

UNITED STATES PATENT OFFICE.

AUGUSTIN J. LE TARTE, OF SCHENECTADY, NEW YORK.

CONNECTION DEVICE.

1,355,678.     Specification of Letters Patent.     Patented Oct. 12, 1920.

Application filed January 23, 1920. Serial No. 353,501.

*To all whom it may concern:*

Be it known that I, AUGUSTIN J. LE TARTE, a citizen of the United States, residing at Schenectady, in the county of Schenectady, State of New York, have invented certain new and useful Improvements in Connection Devices, of which the following is a specification.

The present invention comprises a device adapted to prevent the displacement of piping, and it is particularly adapted to prevent harmful strain on pipe connections to a container, such, for example, as a gas meter.

One of the objects of my invention is to provide a rugged device which is constructed as to compel a proper alinement and connection of piping to a meter. Other objects of my invention are to prevent strain on meter connections, to save labor in installation, and cost in construction.

Heretofore various devices have been suggested to obviate strain and damage to gas meters, but all the devices which have appeared have been constructed either to support the meter or have consisted of a crossbar rigidly attached to the piping. A careless pipe fitter by depending on these devices to take care of defective connections is apt to grow even more careless so that in many cases nothing is gained. A gas meter container consists of thin sheet metal and its connections consequently are easily damaged with consequent danger to life and property.

In accordance with my invention, I have provided a device adapted to slip on the inlet or service pipe and the outlet pipe preparatory to making connection to a meter. This device not only requires a proper alinement of piping in order to permit of its engagement with the piping, but also when positioned will keep the pipes in proper alinement, insuring proper connection to the meter and the prevention of damage to the meter connections after installation. The novel features of my invention will be pointed out with greater particularity in the appended claims.

Figure 1:
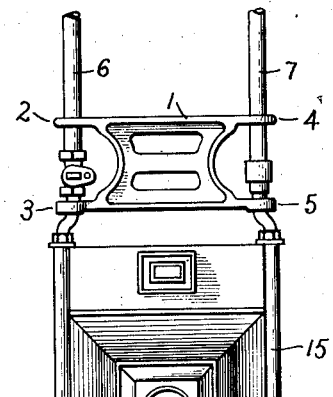
Figure 2:
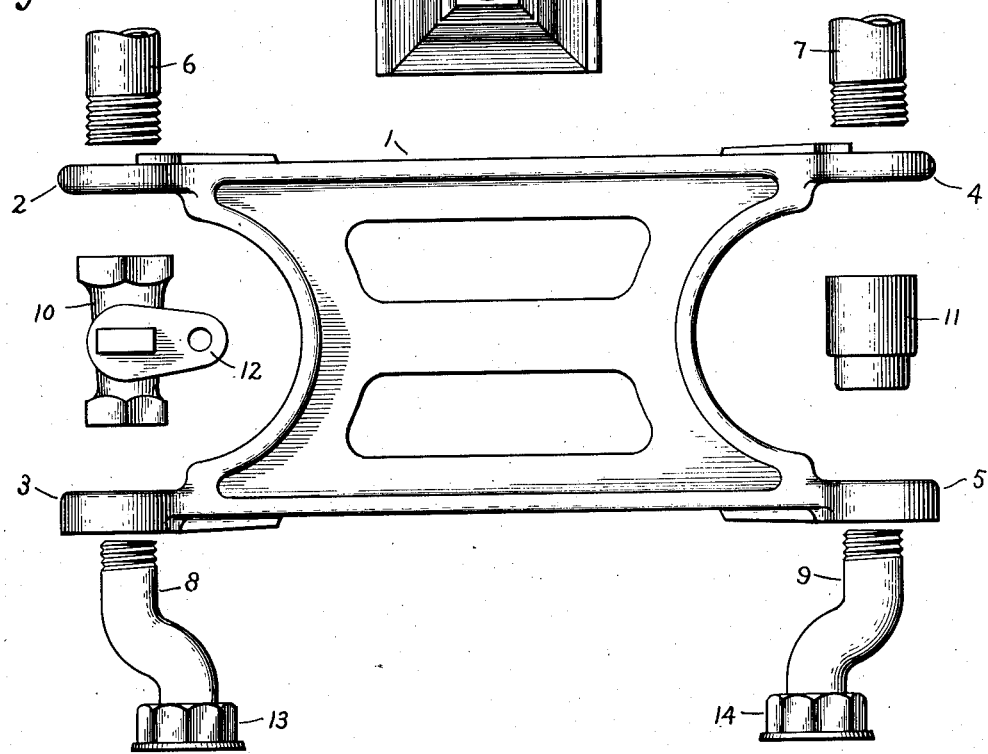
Figure 3:
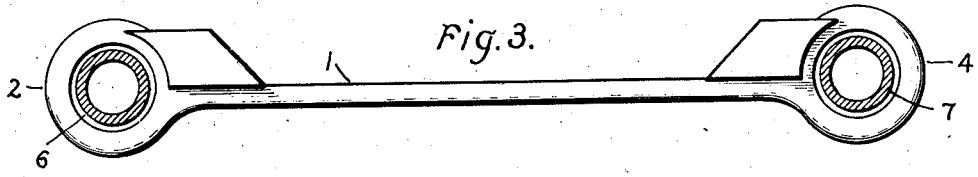

In the accompanying drawing, Figure 1 is a perspective view of a device embodying my invention placed in position on a meter; Fig. 2 shows the parts of the meter connection before being assembled; and Fig. 3 is a plan view of the connecting device.

The device shown in the drawing consists of a rigid frame 1 having connected thereto two sets of paired ring guides 2, 3 and 4, 5, which are adapted to loosely engage the gas piping. These guides conveniently are connected to the corners of the rectangular frame and are positioned at right angles to the plane of the support. The guides are alined and spaced with respect to each other to bring the gas pipes to the meter in a most suitable position. Preferably axes passing through each pair of guides are parallel to each other so as to require the pipe fitter to place the inlet pipe 6 and the outlet pipe 7 parallel to each other with a predetermined separation in order to permit the pipes 6, 7, to pass through the guides of the connector. As the connector is without bolts, nuts, screws, or other adjustable parts, it requires no extra time to install the same providing the pipes are properly spaced.

After the pipes have been slipped through one of the guides on each side of the frame the meter couplings 8, 9, are slipped through the opposite or lower guides and joined to the pipes 6, 7, by suitable unions 10, 11, one of which may contain a cut-off cock 12. When this connection is made the guide frame 1 is locked in a position from which it cannot be displaced. The meter couplings are offset or bent, as illustrated clearly in Fig. 1, so that the distance between the centers may be varied by rotating the motor couplings through an arc of 180° in order to accurately aline with the meter tubes which may be spaced apart variable distances on different meters. When thus alined the screw nuts 13, 14, are attached to the connecting tubes of the meter 15.

The connection device is loosely slipped over the gas pipes permitting a certain amount of play in order to permit adjustment of the off-set couplings to any slight tilt or incline of the meter screws.

By the use of my improved connector, the connection is made with the piping and meter in a vertical position, and no strains exist that may cause leaks in the meter. Although my improved connector fits slidably on the gas pipes it remains locked in position with the meter as long as the meter connections remain. Should the pipe lines running to and from the meter pull out of their fastenings no damage will be done to the meter as the slip-on connector will carry the strain and prevent distortion of the connections immediately adjacent the meter. In other words, in case of any loosening of the pipe system the inlet and outlet pipes near the meter will be held rigidly in an iron frame and damage to the meter connections will be prevented.

As my improved connecting device is cast as a single piece and requires no machining, its construction cost is low, and as it contains no parts requiring attachment to the piping or the meter it may be used with pipes and meters of different dimensions.

While I have described my invention with particular reference to gas meter connection, it is obvious that the advantages of my invention may be secured in various other applications requiring a proper alinement of piping or the like.

What I claim as new and desire to secure by Letters Patent of the United States, is:—

1. A device for locating rigid conduits in proper position and alinement to be secured to meters and the like, characterized by the provision of a rigid member having a plurality of sets of alined conduit-receiving openings spaced so as to locate the ends of said conduits therein in a predetermined relation whereby said conduits are adapted for coupling without strain to a meter or the like having conduit connections spaced in predetermined alinement.

2. The combination of a gas meter, inlet and outlet pipes connected to the upper part of said meter and a rigid frame having paired guides located on opposite sides of said frame, said guides being adapted to engage with said pipes and being alined to maintain said pipes spaced in a desired position.

3. A device adapted to protect pipe connections for gas meters or the like comprising a rigid frame, ring-shaped guides having a larger diameter than said pipe connected to said frame and alined to maintain said pipes in a desired position, and couplings having a bend rotatably carried by two of said guides whereby junctions to meters or the like having openings spaced apart different distances may be made by rotating said couplings.

4. A device for protecting pipe connections to containers comprising spacing means having a plurality of sets of alined guides adapted to loosely encircle pipes to be connected.

5. A device adapted to prevent strain on meter couplings comprising a frame having two sets of guides each of said sets being adapted to engage slidably with the pipes connected to said meter, said guides being spaced to hold said pipes in a desired alinement with respect to said meter, and means for locking said frame in a desired position.

6. The combination of a container, upwardly extending pipe connections thereto and a rigid frame having a plurality of guides located on opposite sides of said frame, said guides engaging with said pipes and the guides on each side of said frame being spaced with respect to each other to maintain said pipes in a desired alinement.

7. The combination of a gas meter, upwardly extending pipe connections to said gas meter, and a frame, having a pair of ring-shaped guides located on opposite sides of said frame, said guides encircling said pipes to maintain the same in a desired alinement.

In witness whereof, I have hereunto set my hand this 21st day of January, 1920.

AUGUSTIN J. LE TARTE.